Jan. 25, 1938.  B. S. AIKMAN  2,106,472
FLUID PRESSURE CONTROLLED CLUTCH
Original Filed July 30, 1932  2 Sheets-Sheet 1

INVENTOR
BURTON S. AIKMAN.
BY *Wm. M. Cady*
ATTORNEY

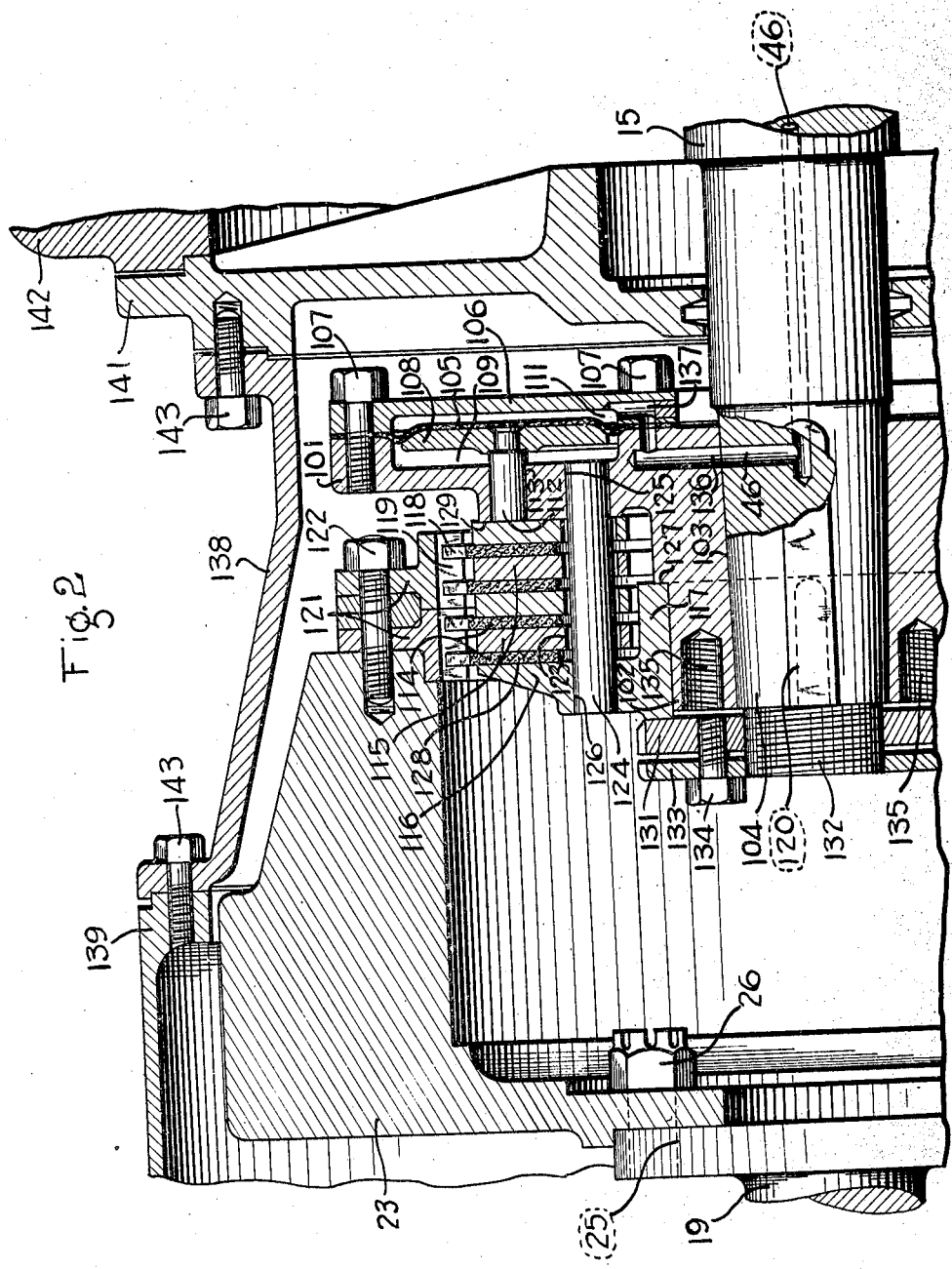

Patented Jan. 25, 1938

2,106,472

UNITED STATES PATENT OFFICE 2,106,472

FLUID PRESSURE CONTROLLED CLUTCH

Burton S. Aikman, Wilkinsburg, Pa., assignor to The Westinghouse Air Brake Company, Wilmerding, Pa., a corporation of Pennsylvania Original application July 30, 1932, Serial No. 626,504. Divided and this application June 22, 1934, Serial No. 731,856

2 Claims. (Cl. 192—85)

This invention relates to fluid pressure controlled clutches, particularly to clutches controlled by the pressure of fluid lubricant, and is a divisional application of my co-pending application, Serial Number 626,504, filed July 30, 1932, assigned to the assignee of this application.

It is an object of the invention to provide a fluid pressure actuated clutch adapted to be supplied with fluid under pressure through a passage in a rotary shaft with which the clutch is associated.

Another object is to provide a fluid pressure actuated clutch having a novel cooperative arrangement of parts whereby a pressure chamber is formed and whereby a movable clutch element is supported and guided.

These and other objects of the invention that will hereinafter appear throughout the further description thereof, are attained by the apparatus hereinafter described and illustrated in the accompanying drawings, wherein;

Fig. 2 is a fragmental sectional view of a modified form of clutch device.

Figure 1:
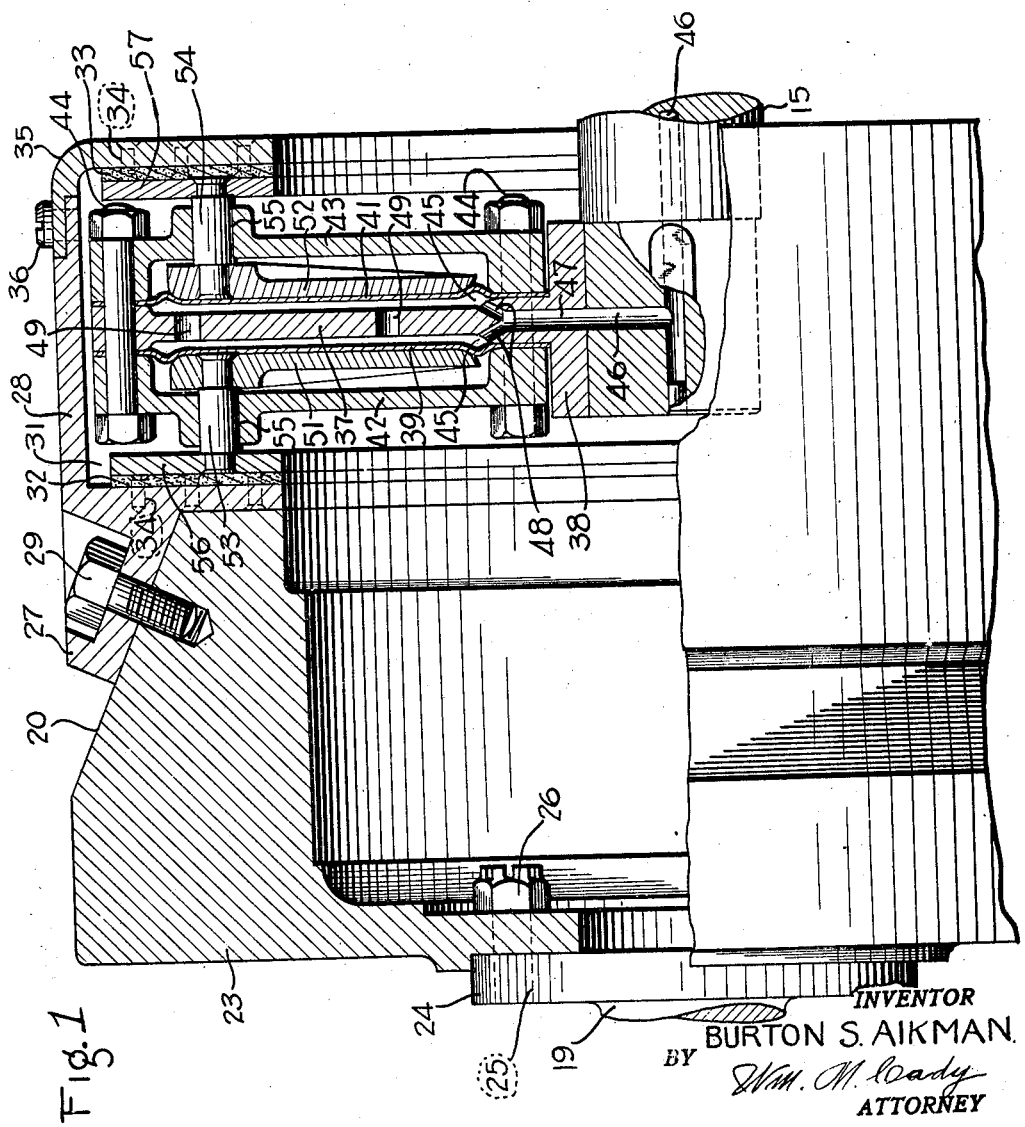
Fig. 1 is a fragmental sectional view, partially in elevation, of an improved clutch device embodying my invention.

Referring to Fig. 1, the clutch device is shown associated with the fly wheel 23 of an internal combustion motor, which is attached to the flange 24 on the end of the driving crank shaft 19 of the motor, by means of the usual bolts 25 that are secured in place by threaded nuts 26. The peripheral surface of the fly wheel 23 is provided with a tapered portion 20 for receiving a tapered flange 27 of an annular clutch housing 28, that is secured to the fly wheel by means of bolts 29. The clutch housing 28 is provided with a deep annular internal chamber 31 in which annular friction discs 32 and 33, preferably made of composition material, are secured to the sides of the chamber by means of countersunk rivets 34.

In order to facilitate assembly of the clutch parts, the housing 28 is made in two pieces, namely the flanged portion attached to the fly wheel 23, and the outer flanged portion 35 that is detachably connected to the body of the housing by means of threaded bolts 36.

A carrier disc 37, having a hub 38, is keyed to a driven shaft, such as a compressor crank shaft 15, so that it rotates with the crank shaft. The carrier disc is disposed midway between the friction discs 32 and 33 and movable abutments, shown as annular flexible diaphragms 39 and 41, are clamped on the opposite sides of the disc 37 by means of annular guide plates 42 and 43, respectively, which are secured to the carrier disc by means of bolts 44. The diaphragms are preferably made of rubber composition or any material that will permit of a relatively great deflection without detrimentally affecting the life of the diaphragm. It has been found that diaphragms made of a plurality of thin metal sheets are also satisfactory for this purpose.

Annular chambers 45 are provided on opposite sides of the disc 37 between the disc and the inner faces of the diaphragms 39 and 41 for receiving fluid under pressure supplied thereto through a passage 46 in the compressor crank shaft 15, which registers with a passage 47 in the hub 38 of the disc 37 and which opens into the chambers 45 through branch passages 48. Communication is established between the chambers 45 by means of passages 49 extending through the disc 37 from one side thereof to the other and through the passages 48.

Annular follower plates 51 and 52 are mounted, respectively, on the diaphragms 39 and 41, and the plates are provided with pins 53 and 54, respectively, which slidably extend through guide openings 55 in the clamp plates 42 and 43. Clutch plates 56 and 57, preferably made of metal, are secured to the outer ends of the pins 53 and 54, respectively, and are adapted to be forced into frictional engagement with the friction discs 32 and 33, respectively, when the clutch plates are forced outwardly from the carrier disc 37 by the diaphragms 39 and 41 in response to the pressure of fluid within the chambers 45 between the diaphragms. From the foregoing, it is apparent that when sufficient fluid pressure is applied to the inner faces of the diaphragms 39 and 41, the clutch plates 56 and 57 will be forced into driving engagement with the friction discs 32 and 33.

In Fig. 2, a modified form of clutch device is illustrated, wherein a single annular diaphragm or abutment serves to force a plurality of clutch discs into frictional engagement when fluid under pressure is applied to one face of the diaphragm.

The modified form of clutch device is shown applied to the crank shaft 19 of an internal combustion motor having a fly wheel 23 secured thereto, as in the clutch device shown in Fig. 1.

The carrier disc 101, having a hub portion 102, is keyed upon the shaft 15 of the compressor. The hub 102 is provided with a tapered opening 103 for receiving the tapered end 104 of the shaft 15, and longitudinal displacement of the hub with respect to the shaft is prevented by a lock nut device to be hereinafter described.

A flexible diaphragm 105 preferably made of rubber composition, or other suitable material, is clamped upon one side of the carrier disc 101 by means of an annular clamping plate 106 that is secured to the carrier disc by means of bolts 107. An annular follower 108 is mounted within the chamber 109 and is secured to the diaphragm 105, so that upon an increase of fluid pressure within the chamber 111, the follower is moved leftward with a series of disc operating pins 112, one of which is shown, secured to the follower 108 and extending through guide opening 113 in the carrier disc 101.

A series of discs 114 and 115 are adapted to be clamped between the outer ends of the pins 112 and a supporting disc 116 having a hub portion 117 that is keyed upon the hub 102 by a key 120. The clutch discs 114 are adapted to turn with the fly wheel 23 and are provided with teeth 118, which engage teeth 119 that are formed integral with metal rings 121 which are secured to the fly wheel 23 by means of bolts 122. Additional discs 114 may be added and the capacity of the clutch increased by increasing the number of rings 121 sufficiently to accommodate the added discs 114 and 115.

The clutch discs 115 are adapted to rotate with the compressor crank shaft 15 and the carrier disc 101, and are provided with holes 123 through which a series of pins 124, one of which is shown, extend. The pins 124 fit snugly into alined openings 125 and 126 in the carrier disc 101 and the supporting disc 116, respectively.

The inner face of the hub 117 of the supporting disc 116 engages a shoulder 127 on the hub 102, so as to limit the inward movement of the supporting disc 116. Sufficient space is provided between the disc engaging face 128 of the supporting disc 116 and the disc engaging face 129 of the carrier disc 101 to permit slight separation of the discs 114 and 115, so that the fly wheel 23 may rotate without imparting movement to the carrier disc 101.

When sufficient pressure is exerted within the chamber 111, the follower 108 is forced toward the left, so that the outer ends of the pins 112 are forced against the adjacent outer disc 115. The pressure applied to the outer disc 115 is transmitted to the discs 114 and 115 disposed between the supporting disc 116 and the outer clutch disc 115 engaged by the pins. The gradual increase of pressure on the diaphragm 105 causes the clutch disc to gradually accelerate the crank shaft 15 until it is rotating at the same speed as the motor. Sufficient pressure is ordinarily applied to the clutch disc to prevent slipping of the discs while the clutch is in connecting position.

The supporting disc 116 is locked upon the shaft 15 by a threaded nut 131 which is threaded upon a threaded portion 132 of the shaft 15. The nut 131 is adapted to be locked in locking position by means of a relatively thin nut 133, that is adapted to be pinched upon the threaded portion 132 of the crank shaft by a threaded bolt 134, which tends to deflect one side of the nut 133 toward the nut 131. Tapped holes 135 are provided in the hub 102 for the insertion of a gear puller when it is desired to remove the carrier disc from the crank shaft 15.

Fluid under pressure is supplied to the chamber 111 through a passage 46 in the crank shaft 15 and a passage 136 in the hub 102 of the carrier disc 101 which registers with a passage 137 in the clamping plate 106.

The entire clutch assembly is protected by a flanged casing 138, which is secured to the motor housing 139 and to the end plate 141 of the compressor housing 142 by means of bolts 143. It will be noted that the mounting for the clutch discs 114 is such that the crank shaft 15 may be moved to the right and away from the fly wheel 23 by movement in the direction of the axis of the crank shaft, so that the clutch device may be readily disassembled for inspection and repairs.

It is obvious that the improved clutch and controlling mechanism is applicable to any form of apparatus having driving shafts which are to be releasably connected and that changes, additions and omissions may be made in the construction of the clutch and the control mechanism therefor without departing from the spirit of the invention.

Having now described my invention, what I claim as new and desire to secure by Letters Patent, is:

1. A clutch device comprising a rotatable shaft having a passage therein through which fluid may flow, a disc mounted on said shaft for rotation therewith, a diaphragm mounted on said disc, a guide member having guide openings therein and carried by said disc for clamping said diaphragm to said disc so as to provide a fluid-tight chamber between said disc and said diaphragm for receiving fluid under pressure from said passage in said shaft, a follower for said diaphragm having operating pins extending through the guide openings in said guide member, a clutch member operated by said follower through the medium of said pins, a second rotatable shaft, and a clutch member carried by said second rotatable shaft for cooperating with said first clutch member and thereby effecting a driving connection between said shafts.

2. A clutch device comprising a disc member adapted to be secured to a shaft, a diaphragm mounted on said disc, a guide member having guide openings therein and carried by said disc for clamping said diaphragm to said disc so as to provide a fluid-tight chamber between said disc and said diaphragm for receiving fluid under pressure, a follower for said diaphragm having operating pins extending through said guide openings, a clutch member operated by said follower through the medium of said pins, a second clutch member adapted to be secured to a second shaft for cooperating with said first clutch member and thereby effecting a driving connection.

BURTON S. AIKMAN.